United States Patent [19]
Gendrot

[11] 3,827,080
[45] July 30, 1974

[54] METHOD AND DEVICE FOR RECORDED AUDIO-VISUAL PROGRAMMING

[76] Inventor: André Jean-Claude Gendrot, 102, rue Anatole, 92700 Drancy, France

[22] Filed: Oct. 20, 1972

[21] Appl. No.: 299,588

[30] Foreign Application Priority Data

Oct. 20, 1971 France .......................... 71.37738

[52] U.S. Cl. .................................. 360/80, 353/86
[51] Int. Cl. ..................... G11b 23/36, G03b 21/20
[58] Field of Search .............. 179/100.2 S, 100.2 B; 353/83, 86, 88, 90

[56] References Cited

UNITED STATES PATENTS

| | | | |
|---|---|---|---|
| 3,181,421 | 5/1965 | Nimke et al. | 179/100.2 S |
| 3,282,155 | 11/1966 | Cleary et al. | 353/86 |
| 3,480,738 | 11/1969 | Meyer et al. | 179/100.2 S |
| 3,622,236 | 11/1971 | Novy | 353/86 |

*Primary Examiner*—Alfred H. Eddleman
*Attorney, Agent, or Firm*—Steinberg & Blake

[57] ABSTRACT

The programming of the operation of several audio-visual apparatuses such as coupled slide projectors is recorded on the same carrier as and in synchronism with said recording. This program is then operated by the device of this invention utilizing programming and/or operating circuits sharing command logic circuits. The latter include essentially a shift register and an output flip-flop triggered by recurrent pulse trains. Each pulse is assigned according to its position to a particular command and is modulated in time duration in accordance with the variations of said command. By integrating the pulses of one and the same position in successive pulse trains, the variations of the respective command concerned can be reproduced.

9 Claims, 5 Drawing Figures

METHOD AND DEVICE FOR RECORDED AUDIO-VISUAL PROGRAMMING

The present invention relates generally to the programming of audio-visual displays and particularly to controlling, in accordance with a complex program, the projection of pictures and/or the performing of light effects illustrating or accompanying a sound recording, while simultaneously reproducing the sound.

The programming of an audio-visual display including visual effects accompanying an audio recording, may be carried out manually by an operator utilizing a control desk, to link together the elements of the display while using the playing of the sound recording as a reference. Such a technique not only requires the constant attention of an operator during each display, but also incurs the risk of handling errors which can disturb the display process. Consequently, the programming of such a display is advantageously recorded on one or more special tracks of a magnetic tape which serves as the carrier of the sound recording. In such systems, the display program may be prepared in advance, and its reproduction may be automatically controlled without any human intervention and risk of error.

However, the recording of a relatively complex audio-visual display program involving coordination of several audio-visual apparatuses, such as slide projectors in synchronism with sound recording, gives rise to difficult technical problems. Heretofore, such complex programs have utilized complex coding processes, such as frequency-division multiplexing, which requires apparatus and are costly and delicate, therefore liable to failures. Under such conditions, it is not possible to attain sufficient reliability unless there is provided both large safety margins for the use of such apparatus as well as a higher redundancy of the recorded information.

The present invention is directed at avoiding the aforementioned drawbacks of the prior known techniques by providing a novel and improved method and apparatus for a recorded program coordinating the control of several audio-visual apparatus, such as slide projectors, in synchronism with a sound recording. The method and apparatus of the invention uses very simple and, therefore, highly reliable information coding and decoding means.

The method according to the invention is essentially characterized in that:

During the programming, a sequence of periodic pulse trains are generated in conjunction with the sound recording, the tine position of each pulse represents a predetermined command to an audio-visual apparatus and the duration of each pulse being respectively modulated in accordance with variations of each predetermined command, the modulated sequence of pulse trains being recorded on the sound recording carrier, and, during use, simultaneously reading the sound recording and the modulated sequence of pulse trains separating the individual pulses by their respective time positions and integrating the pulses of the same time positions in order to determine the variations of each predetermined command.

The device according to the invention for carrying out the above method is essentially characterized in that it comprises, a logic circuit, a programming circuit and an operating circuit.

The logic circuit includes a shift register formed of $n$ bi-stable multivibrators or flip-flops, each of which is assigned to control a predetermined command. The shift register is triggered by successive pulse trains each train including $n+1$ periodic clock pulses. The first bi-stable multivibrator of the shift register is leaded during the interval between two successive pulse trains. An output bi-stable multivibrator or flip-flop is triggered by each of the clock pulses and is reset at the end of a variable duration shorter than one period.

The programming circuit includes a multivibrator or other oscillator which generates clock pulse trains, and $n$ monostable multi vibrators each of which is respectively associated with and is respectively triggered by one of the bi-stable multivibrators of the shift register, as soon as that bistable multi vibrator is loaded. The monostable multi vibrators are each reset at the end of a duration shorter than one period. Each duration is respectively adjusted according to the instanteneous value of each predetermined command. The resetting of each monostable multivibrator causes the resetting of the output bi-stable multivibrator of the logic circuits. The periodic output signal from the output bistable multivibrator therefor includes successive trains of $n$ each pulses modulated in duration the pulses being recorded on the sound recording carrier.

The operating circuit includes two differentiating circuits, to which are applied the modulated periodic pulse trains which are read from the sound recording carrier. The differentiating circuits generate pulses corresponding to the leading and trailing edges of each of the periodic pulses, the leading pulses being used as clock pulses to trigger the bi-stable multivibrators of the shift register and the output bi-stable multivibrator of the logic circuit. The trailing pulses control the resetting of the latter. The output signal from the output bistable multivibrator is successively combined with the outputs of each of the bi-stable multivibrators of the shift register by successive ones of n associated AND gates. The output from each AND gate is applied to a respective integrating circuit which determines the variations of each predetermined command.

It is readily understood that the method and apparatus according to the invention controls the recorded programming of a complex audio-visual display with great reliability. Each command is assigned to a respective pulse at a particular time position, and the information about the command is following coded by width modulation of that pulse, which is not subject to alteration by undesired effects either during the recording or during the reading. Such a process of coding also offers the advantage of permitting the recording of all the commands on a single special track of the magnetic tape constituting the carrier of the sound recording. Furthermore, the circuits used may be readily obtained in the form of integrated circuits, thus considerably reducing the overall size, the consumption and the cost of the apparatus while at the same time improving its safety in use.

Other features and advantages of the invention will appear more clearly from the following detailed description of one non limiting example of an embodiment illustrated by the appended drawings wherein:

FIG. 1 schematically shows an audio-visual device provided with a recorded programming arrangement according to the invention;

Figure 1:
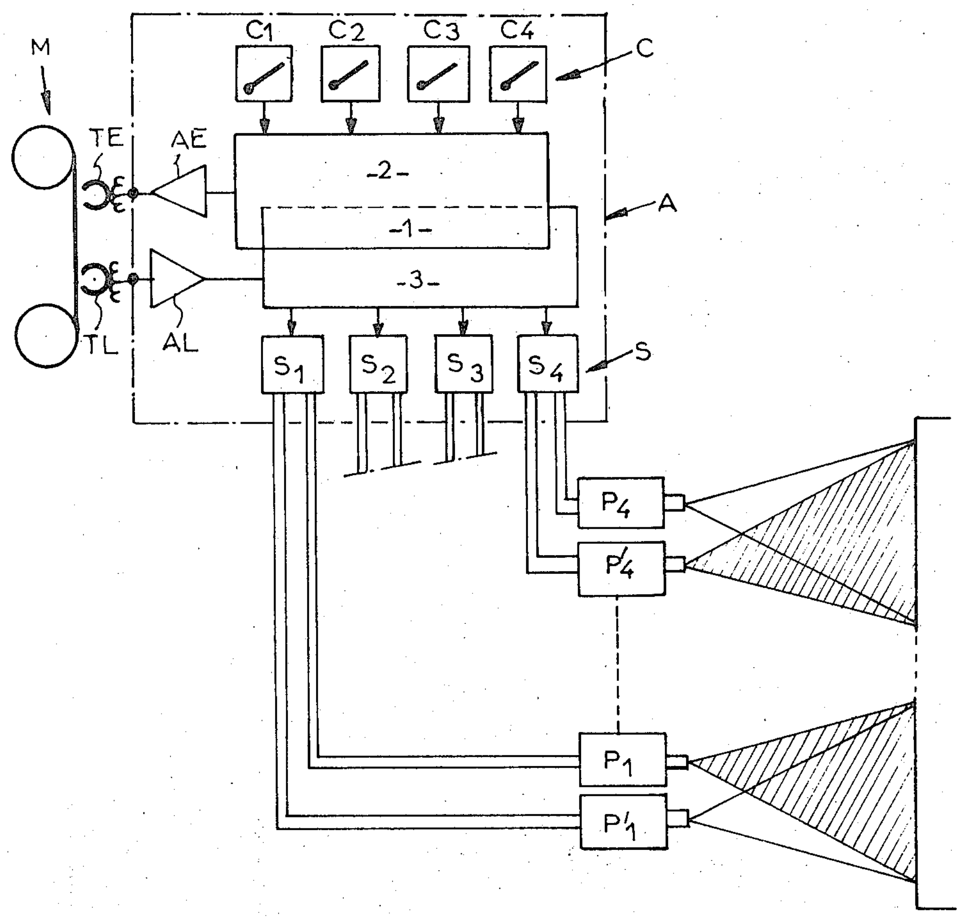

FIG. 1 is a schematic representation of an audio-visual device according to the invention, including a magnetic-tape recorder M reproducing of a sound recording occupying one or several tracks of a magnetic tape. One special track of the tape is assigned to coded signals for co-ordinated and automatic control of four projection units, each of which includes two projectors P–P′ operating alternately to permit lap-dissolve or cross-fade transitions. The magnetic-tape recorder M is coupled to the projectors P–P′ through apparatus A which comprises a logic circuit 1 containing the common portion of a programming circuit 2 and an operating circuit 3. Associated with the programming circuit 2 are control members C, and associated with the operating circuit 2 are output circuits S. Each control member and output circuit respectively correspond to each of the pairs of projectors P–P′ to be controlled. The programming circuit 2 is connected to a recording head TE of the magnetic-tape recorder M through amplifier AE. A corresponding reading head TL is connected to the operating circuit 3 through amplifier AL.

Figures 2, 3, 4:
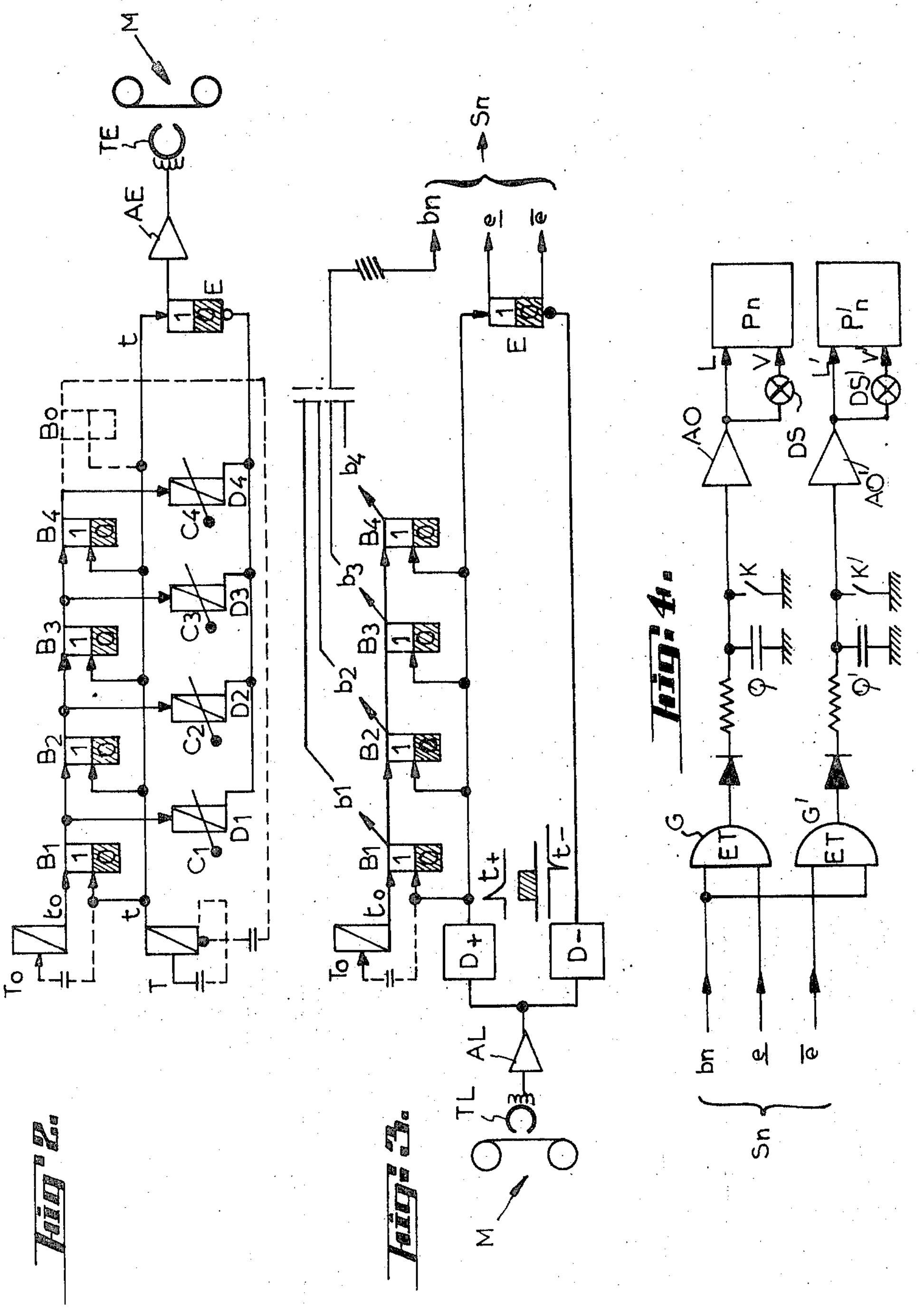
FIG. 2 is a block-diagram of the circuits used in the device for the recording of the programming arrangement.
FIG. 3 is a block-diagram of the circuits used in the device for the working of the programming arrangement.
FIG. 4 is a diagram of one of the output circuits of the device.

The block-diagram of the circuits involved during the programming is shown in FIG. 2. Four bi-stable multivibrators or flip-flops B1–B4 form a four-position shift register. The shifting is controlled by successive trains of five periodic pulses $t$ generated, by a multivibrator T or other oscillator. At the time of every sixth pulse, the multivibrator is inhibited by an inhibit flip-flop Bo arranged at the output of the shift register B1–B4. During the interval of time thus created between the successive trains of clock pulses, the first bi-stable multivibrator B1 of the shift register is loaded by a signal to produced during the resetting of a monostable multivibrator To which is triggered by the clock pulses $t$. The duration of the quasi-stable state of the monostable multivibrator is between one and two time periods of the periodic clock pulses. The output of each of the bi-stable multivibrators B1–B4 controls the triggering of an associated monostable multivibrator D1–D4. The duration of the quasi-stable state of these monostable multivibrators can be adjusted to any duration shorter than the recurrence period of the clock pulses $t$ by means of a corresponding control member C1–C4 The clock pulses $t$ also control the triggering of an output bi-stable multivibrator E, the resetting of which is controlled by the resetting of any one of the monostable multivibrators D1–D4. The output of the bi-stable multivibrator E is applied, to the recording head TE of the magnetic-tape recorder M through the amplifier AE. Consequently, the signal recorded on the special track of the magnetic tape includes successive pulse trains of four rectangular pulses, the leading edges of which are separated by a constant time period and the width of which is modulated according to the position of the control members C1–C4 of the same position as the pulse being considered.

The block-diagram of the circuits involved during the operation of the program thus recorded, is shown in FIG. 3. In this Figure there is shown the shift register B1–B4, the monostable multivibrator To, and the output bi-stable multivibrator E, which comprise the logic circuit 1 and which is common to both the programming circuit 2 and the operating circuit 3. The signals previously recorded on the magnetic tape are read by the reading head TL of the magnetic-tape recorded M and applied to two differentiating circuits D+, D–, Differentiating circuit D+ generates pulses $t+$ and differentiating circuit D– produces pulses $t-$. These pulses correspond respectively to the leading and the trailing edges of each recorded pulse. Thus, the pulses $t+$ correspond to the aforesaid clock pulses $t$ and are used as clock pulses to control the shifting of the shift register B1–B4; to control the triggering of the monostable multivibrator To, and bi-stable multivibrator E. Likewise, the pulses $t-$ correspond to the resetting of each of the monostable multivibrators D1–D4 of the programming circuit and are used to control the resetting of the output bi-stable multivibrator E. Consequently, the output signal of the latter faithfully reproduces the signal recorded on the magnetic tape during the programming. The various pulses constituting the signal are separated according to their position by means of the bi-stable multivibrators B1–B4 of the shift register of the logic circuit and by means of AND gates incorporated in the output circuits S1–S4 each respectively coupled to the bi-stable multivibrators.

FIG. 4 shows a diagram of one of the output circuits. The output signal $b_n$ from the bi-stable multivibrator of the corresponding position in the shift register is applied to one of the inputs of an AND gate G, the other input of which receives the true output signal $e$ of the output bi-stable multivibrator E. This means that when each pulse train recorded on the magnetic tape is read, a gate is rendered conductive corresponding to the position of the pulse considered. The output signal of the gate G charges a capacitor Q through a diode and resistance. The capacitor Q is shunted by a switch K which is operated at the beginning of each pulse train by means which are not shown. Thus, at the end of each pulse train, the voltage across the capacitor Q of a given output circuit corresponds to the width of the correspondingly positioned pulse recorded on the magnetic tape. This is because the duration of quasi-stable state of the correspondingly positioned monostable multivibrator D is adjusted by the setting of the associated control member C during the programming. It is therefore sufficient to process this voltage, for instance by means of an operational amplifier AO, in order to obtain at the analog output signal L, the amplitude of which corresponds to the setting of the corresponding member C during the programming. The analog signal L may be used, to control the supply to the lamp of the projector Pn and thereby control the brightness of the projected picture. The variations of the analog signal L may also control an auxiliary system such as a change of frame during the extinguishing of the projector lamp by means of a threshold detector DS or by a differentiating circuit.

As has already been mentioned in connection with the description of FIG. 1, the device according to the invention is particularly adapted to control of pairs of projectors operating alternately with lap-dissolve or cross-fade transition. To this end, there is associated with each output circuit Sn a second AND gate G′, having as its inputs the output signal Bn of the bi-stable multi-vibrator of the same position and the false output signal $\bar{e}$ of the output bi-stable multivibrator E. The output signal of the gate G′ is used in the same manner as that of the gate G to control the brightness variations and the frame changes of the projector P′n associated with the projector Pn. Indeed, at any moment, the analog signals L, L′ thus obtained vary inversely, thereby enabling the lap-dissolve effect to be obtained automatically.

Figure 5:
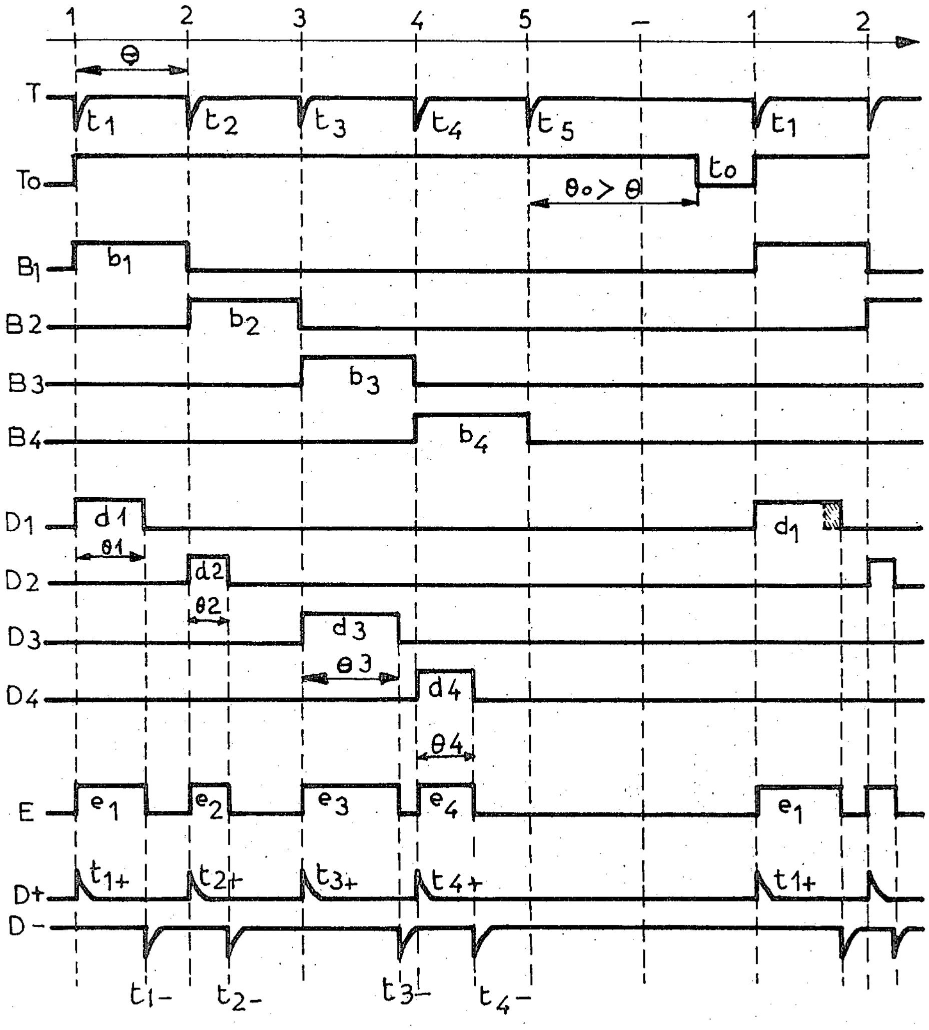
FIG. 5 is a graph illustrating the time operation of the device.

The graph of FIG. 5 permits a better understanding of the apparatus according to the invention.

On this graph is shown a train of clock pulses t1–t5 generated by the multivibrator T of the programming circuit. These five consecutive pulses are generated at a constant recurrence frequency with a period $\theta$ and, after an interval of time corresponding to the sixth inhibited pulse, are followed by a further train of five clock pulses. During this interval, the monostable multivibrator To, is reset after a delay $\theta_0$ which is substantially equal to one and a half times the recurrence period $\theta$, and produces the pulse t0 which loads the first bi-stable multivibrator B1 of the shift register. Switching of the multi-vibrator B1 by the second clock pulse t2 causes the loading of the multivibrator B2. The pulses t3 and t4 respectively cause the loading of the multivibrators B3 and B4, the latter being unloaded by the last pulse t5. The loading of each bi-stable multivibrator B1–B4 causes the triggering of the corresponding monostable multivibrator D1-D4, which remains in the triggered state during the time $\theta 1$ –$\theta 4$ which is adjusted by the position of the associated control member C. The pulses d1–d4 are combined by the action of the output bi-stable multivibrator E of the logic circuits into a single signal formed of four pulses e1–e4 each modulated in duration and succeeding one another with the recurrence period $\theta$. This signal is recorded on the special track of the magnetic tape by means of the amplifier AE and the recording head TE.

During operation, the leading and trailing edges of the pulses thus recorded are read by the reading head TL and by means of the circuits D+, D–, the pulses t1+ to t4+ are produced corresponding to the clock pulses from t1 to t4 and of the pulses from t– to t+ correspond to the resetting of each of the monostable multivibrators D1–D4. The pulses t+ and t– thus generated are processed by the operating circuit of FIG. 3, whereby the bi-stable multivibrators B1–B4 reproduce the pulses b1–b4 and the output bi-stable multi-vibrator E reproduces the pulse trains d1–d4, which are separated according to their positions by the associated output circuits.

It is understood that, the invention is by no means limited to the form of embodiment described and illustrated, which has been given by way of example only. In particular, it comprises all the means constituting technical equivalents to the means described as well as their combinations, should the latter be carried out according to the spirit of the invention.

What is claimed is:

1. A method of recording and operating the programming arrangement of a plurality of audio-visual apparatus each requiring at least one command, wherein the programming arrangement is recorded in synchronism with and on the same carrier as a sound recording, said method comprising the steps of, A. recording the programming arrangement by:
1. generating successive pulse sequences in a time relationship with a sound recording, each sequence having a predetermined number of periodic pulses, and wherein pulses of successive sequences having corresponding time positions all representing the same command,
2. modulating the duration of each pulse in accordance with variations in its respective command,
3. recording the pulse sequences on the sound recording carrier, B. operating the programming arrangement by:
4. simultaneously reading the sound recording and the recorded pulse sequences,
5. separating the modulated pulses of each pulse sequence according to its respective time positions, and
6. integrating the pulses from the sequences according to their corresponding time position to determine the variations in the commands for each time position.

2. Apparatus for recording and operating a programming arrangement of a plurality of audio-visual apparatus each requiring at least one command, wherein the programming arrangement is recorded in synchronism with and on the same carrier as a sound recording, said apparatus including, in combination, A. logic circuit comprising:
1. shift register means formed of *n* successive flip-flops, each of which is assigned to a respective command,
2. trigger means for applying to said flip-flops successive sequences of *n*+1 periodic clock pulses,
3. setting means for loading the first flip-flops of said shift register during the interval of time between two successive sequences of pulses,
4. output flip-flop means which is set by each of said clock pulses and reset at the end of an adjustable time duration which is shorter than the time period between periodic clock pulses, B. programming circuit means for encoding and recording the programming arrangement comprising:
5. generator means for generating said successive sequences of *n*+1 periodic clock pulses and applying them to said trigger means and to said output flip-flop means,
6. resetting means formed of *n* monostable multivibrators each of which is respectively associated with and triggered by a corresponding one of said shift register flip-flops when that flip-flop is loaded, and reset at the end of a time duration shorter than the time period between the periodic clock pulses, said time duration being determined by the variations in the respective command, the output from said monostable multivibrators being connected to said output flip-flop means such that the resetting of each of said monostable multivibrators causes the resetting of said output flip-flop means, whereby the output from said output flip-flop means includes successive sequences of *n* periodic pulses, each pulse being time duration modulated, and 7. recording means for recording the output from said output flip-flop means onto a sound recording carrier, C. operating circuit means for reading and decoding the programming arrangement comprising:

8. reading means for reading the successive sequences of $n$ modulated periodic pulses from the sound recording carrier, 9. differentiating circuit means receiving the modulated periodic pulses from said reading means and generating leading and trailing pulses corresponding respectively to the leading and trailing edges of each of said modulated periodic pulses, the leading pulses being applied to said trigger means and to said output flip-flop means as clock pulses, the trailing pulses being connected to reset said output flip-flop means, D. output circuit means comprising:

10. gating means formed of $n$ AND gates, all the gates receiving as one input thereto the output from said output flip-flop means and each of the gates respectively receiving the output from a corresponding one of the $n$ flip-flop means as its other input thereto, and 11. integrating means formed of $n$ integrating circuits each respectively receiving the output from a corresponding one of the AND gates for determining the variations in the corresponding command.

3. The apparatus of claim 2 and wherein said setting mean includes a monostable multivibrator connected to said trigger means for being maintained in its quasi-stable state by said clock pulses and for resetting itself during the interval of time between two successive sequences of clock pulses, the resetting of said monostable multivibrator providing the loading of said first flip-flop of said shift register.

4. The apparatus of claim 3 and wherein the interval of time between two successive sequences of clock pulses is at least equal to two time periods between successive periodic clock pulses, and the time duration of the quasi-stable state of said monostable multivibrator is longer than said time period and shorter than said interval of time.

5. The apparatus of claim 2 and wherein said programming circuit means further comprise command control means associated with said resetting means for manually adjusting the reset time duration of the quasi-stable state of each of the monostable multivibrators in accordance with variations in their respective commands.

6. The apparatus of claim 2 and wherein said output circuit means further comprises complementary gating means formed of $n$ AND gates, all of the last mentioned gates receiving as one input thereto the complementary output from said output flip-flop means, and each of the last mentioned gates respectively receiving the output from a corresponding one of the $n$ flip-flop means as its other input thereto, and complementary integrating means formed of $n$ integrating circuits each respectively receiving the output from a corresponding one of the last mentioned gates for determining the inverse variations in the corresponding command.

7. The apparatus of claim 2 and wherein each of said integrating circuits includes rectifier means connected to the output of its corresponding AND gate, capacitor means connected to said rectifier means for being charged by the output from said AND gate, and operational amplifier means connected across said capacitor means.

8. The apparatus of claim 2 and further comprising threshold detector means connected to said integrating means for controlling an auxiliary command.

9. The apparatus of claim 2 and wherein said carrier is a magnetic tape, and said audio-visual apparatus includes slide projectors, and said commands includes control of the lap-dissolve, cross-fade transition and frame change.

* * * * *